Patented July 17, 1934

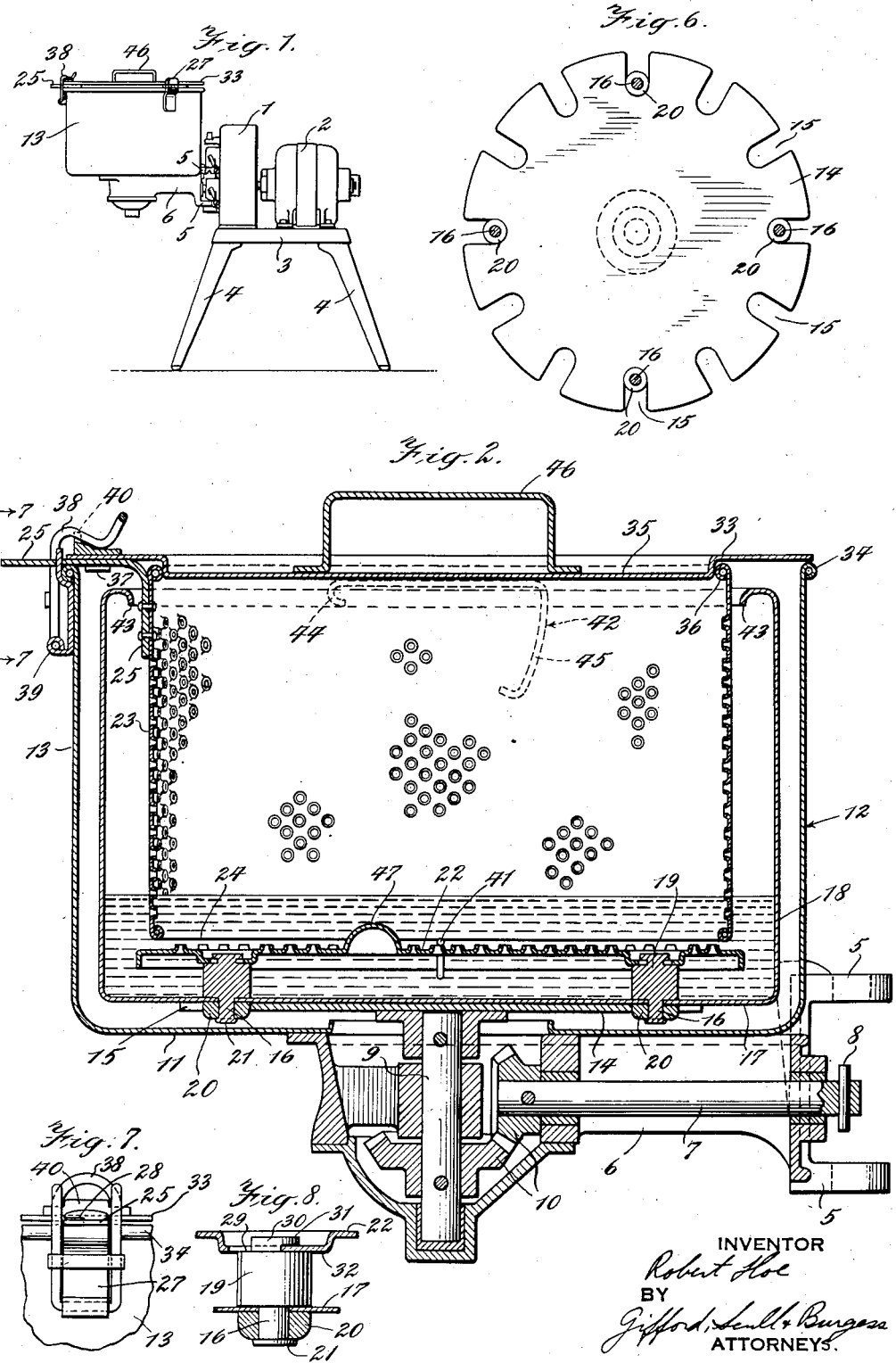

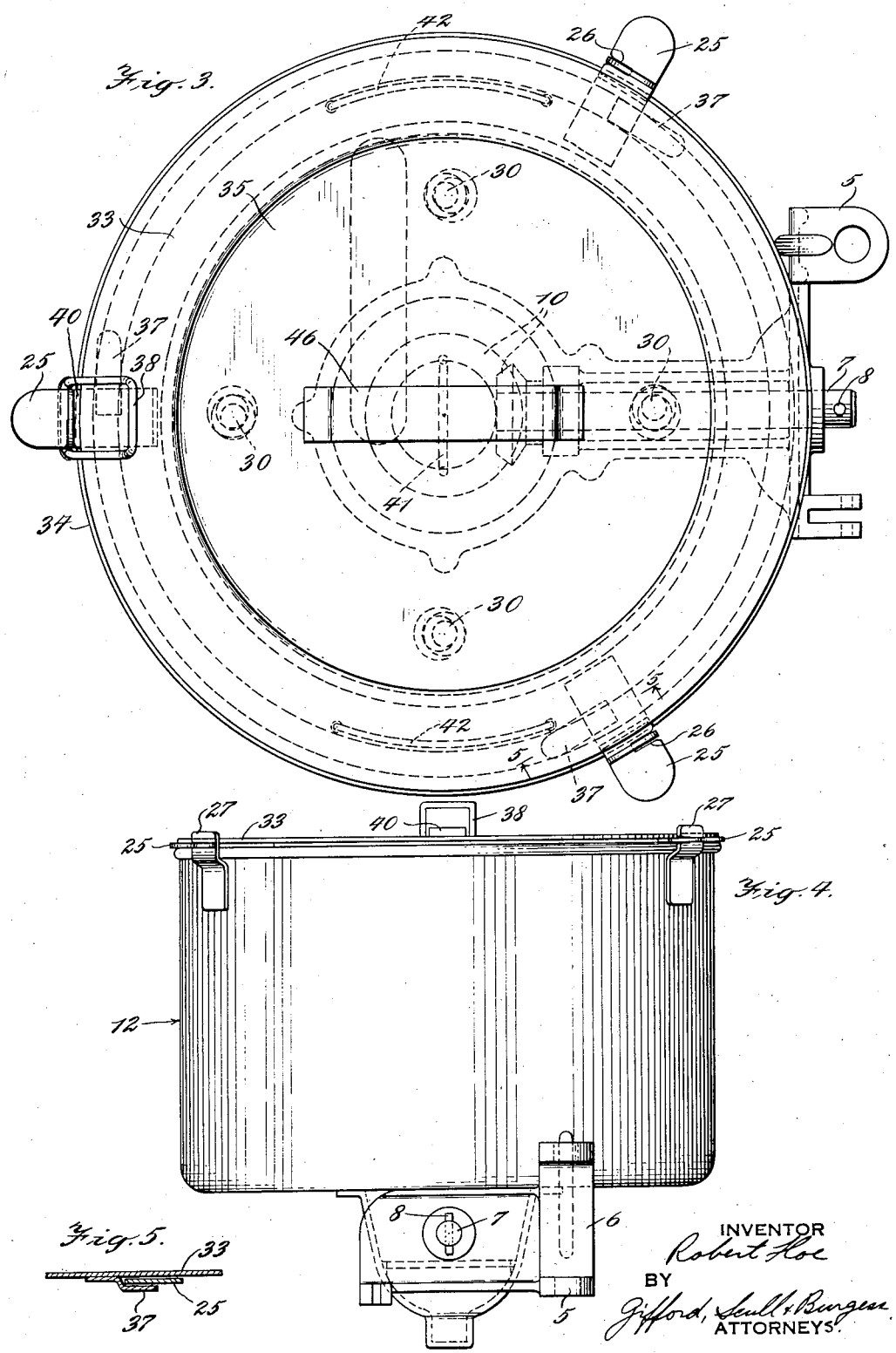

1,966,501

UNITED STATES PATENT OFFICE 1,966,501

APPARATUS FOR PEELING VEGETABLES AND THE LIKE

Robert Hoe, Hyde Park, N. Y.

Application January 15, 1931, Serial No. 508,821

21 Claims. (Cl. 146—49)

This invention relates to a novel and improved apparatus for peeling vegetables, such as potatoes, onions, or the like, and the novel features will be best understood from the following description and the annexed drawings, in which I have shown a selected embodiment of the invention, and in which:

Fig. 1 is a small scale elevation showing the apparatus applied to a power unit;

Fig. 2 is a vertical section on an enlarged scale through the apparatus shown in Fig. 1;

Fig. 3 is a top view of the apparatus shown in Fig. 2;

Fig. 4 is a view taken from the right of Fig. 2;

Fig. 5 is a section on the line 5—5 of Fig. 3;

Fig. 6 is a top view of the rotating plate shown in Fig. 2, and which will be more fully described presently;

Fig. 7 is a fragmentary view taken on the line 7—7 of Fig. 2;

Fig. 8 is a detail view showing the mode of attachment of the false bottom to the bottom of the container, as will be more fully described presently.

Referring first to Fig. 1, I have shown the invention as used in connection with a power unit, such as is more fully described and claimed in my copending application, Serial No. 418,109. This unit may comprise a gear casing 1 containing gearing driven from a motor 2, both casing and motor being supported on a base 3 carried by legs 4. The casing 1 has power outlets in the form of driving shafts to which may be clutched shafts on devices which are hinged to the casing, as more fully described and claimed in my aforesaid copending application. In this apparatus, the hinges are indicated at 5, and are formed on a bracket 6 in which is journaled the driven shaft 7 having a clutch element 8 adapted to cooperate with corresponding clutch elements on a driving shaft journaled in the casing 1.

Also journaled on the bracket is a vertically extending shaft 9, which is driven from the shaft 7 by bevel gears 10, and the upper end of the shaft 9 extends upwardly through the bottom 11 of a casing 12 which has vertically extending sides 13. Fixed to the upper end of the shaft 9 is a horizontally disposed flat plate 14, the construction of which is best shown in Fig. 6. This plate is preferably circular in form, and is provided with a plurality of recesses 15 extending inwardly from its periphery. The number of these recesses is preferably a multiple of four, and they are adapted to receive four legs 16 which extend downwardly from the bottom 17 of a container 18. These legs may be formed as parts of posts 19 which extend upwardly inside the bottom 17, the portion beneath the bottom being of reduced diameter, as plainly shown, and surrounded by bushings 20 which are held in place by the headed-over ends 21 of the legs 16. This construction provides a water-tight arrangement preventing leakage through the bottom of the container, although it is to be understood that equivalent constructions may be used.

The legs are so spaced that when the container is placed on the plate 14, and when one of the legs is received in one of the recesses 15, the other legs will be received in other recesses in the same plate. By providing a relatively large number of these recesses, it is possible to very readily and easily place the container on the plate and attach it thereto so that rotation of the plate will be transmitted to the container.

The posts are shown as extending upwardly a substantial distance from the bottom 17 of the container, and on their upper ends they receive a false bottom 22 which is preferably perforated as indicated, with each perforation formed by piercing the metal of the bottom in such a way that the metal will be pushed upwardly, thus forming a series of rough protuberances on the false bottom which will tear or break the skin of a vegetable which is to be peeled.

The false bottom forms a rotor or movable part of a device for removing skins from vegetables or the like. The stator or fixed part 23 is shown as in the form of a cylinder with vertically extending walls having protuberances similar to those on the false bottom, the diameter of the cylinder being shown as less than the diameter of the false bottom, and the bottom edge 24 of the cylinder being spaced above the false bottom. The stator is preferably secured to the casing, this being done by a plurality of lugs 25 extending outwardly from the stator. As best shown in Fig. 3, these lugs are provided with horizontally extending slots 26 which receive vertically extending portions of lugs 27 secured on the casing 12. These lugs 27 are likewise provided with slots as indicated at 28 in Fig. 7, the slots 26 and 28 being so proportioned that when the parts are in engagement, the edges of the lugs will be substantially flush, as plainly shown in Fig. 3. By this arrangement, the stator or fixed part is held against vertical movement with respect to the casing, and, at the same time, the stator may be attached to, or detached from, the casing by a simple rotative movement of the stator with respect to the casing.

The false bottom is preferably likewise removably attached to the posts 19, and this may be conveniently done by providing on the top of the post a shoulder 29 (Fig. 8) upon which the false bottom may rest, the false bottom at this point being depressed as shown.

Above the shoulder 29 is a head 30 provided with an undercut portion 31 within which the depressed portion 32 may slide. These undercut portions 31 on the respective posts are all facing the same way with respect to a circle drawn through the posts, so that a rotative movement will simultaneously cause all of the parts 32 to enter the undercut portions 31, or to be removed therefrom. The undercut portions are likewise so arranged that during movement of the posts with the bottom 17 to which they are secured, they are moved into engagement with the depressed portions 32 rather than out of engagement therewith.

Disposed over the casing is a cover 33 which rests upon the bead 34 surrounding the top of the casing wall 13, and which has a central depressed portion 35 received within the stator 23 and contacting with the bead 36 at the top thereof. The cover has on its under surface (Figs. 3 and 5) a plurality of downwardly extending catches 37, each so placed as to fit beneath a lug 25. The cover may be put in place and given a slight rotation which will bring the catches 37 beneath the lugs 25. Preferably, this rotation is in a direction opposite to the rotation which will be necessary to withdraw the lugs 25 from engagement with the lugs 27, thereby avoiding accidental detaching of two parts when engaging other parts. The cover is then held in place against rotation by a latch indicated at 38, and which is shown as pivoted to the outside of the casing at 39. This latch engages on opposite sides of a projection 40 on top of the cover, and by preventing rotation of the cover this latch also prevents rotation of the stator.

The false bottom 22 is provided with a handle which may be in the form of a wire bail 41 of well-known form. This bail usually falls down so that it is out of the way, but may be easily grasped with the fingers when it is desired to remove the false bottom. The container is likewise provided with handles which are also shown as wire bails 42, and these are preferably of the novel form shown.

Referring particularly to Fig. 2 it will be seen that the upper edge of the vertical wall of the container 18 is bent inwardly to form an apron 43, and the bails 42 are preferably inserted through holes in this apron. One end 44 of the bail is bent on a short radius so that it has no appreciable vertical movement in its hole in the apron, while the other end 45 is bent on a long radius so that it may, in effect, be rotated about the other end 44. The end 44 is the leading end of the bail during rotation of the container, and, therefore, if by chance the bail is not returned to its inoperative position shown in the drawings, before the apparatus is put in operation, the raised portion of the bail will contact with one of the lugs 25 or other relatively fixed part, and will be cammed down to the position shown, this camming being permitted by the fact that the downward movement is substantially a rotation about the end 44.

The cover 33 is likewise provided with a handle 46, whereby not only may the cover itself be removed and replaced, but the cover may also be rotated to bring the latches 37 into position beneath the lugs 25, and whereby also the entire apparatus shown in Fig. 2 may be lifted and carried about, as may be necessary in operation of the apparatus.

In operation, the parts are preferably assembled by putting the false bottom 22 in place on the posts 19 in the container 18 and placing water in the container to some such level as that indicated in Fig. 2. The stator may then be put in place in the container, with the lugs 25 resting on the apron 43, and the vegetables or other articles to be peeled may be placed within the receptacle formed by the false bottom and the vertically extending walls of the stator. The container is then placed within the casing with the legs 16 in the recesses 15, and the stator is rotated to bring the lugs 25 into engagement with the lugs 27, the lugs 25 being lifted from the apron 43 by the bead 34. The cover is then put in place and rotated until the catches 37 engage beneath the lugs 25, after which the latch 38 is actuated to clamp all parts together.

The apparatus may then be swung on its hinges 5 to bring the shaft 7 into operative position with respect to the driving shaft of the power unit, and the unit may be started in operation. This will cause rotation of the container and the false bottom therein. During this rotation, the ridge 47 will engage the vegetables and tumble them so as to prevent their coming to rest in the center of the bottom. It should be noted that this ridge 47 extends past the center and close thereto, so that there is no opportunity for a vegetable to come to rest near the center. After the device has been operated a sufficient length of time to peel the vegetables, the latch 38 may be disconnected from the cover, and the cover rotated slightly and removed. The operator may then take hold of the bails 42 and, after a slight rotation to disengage the lugs 25 from the lugs 27, may lift from the casing the container, the false bottom, and the stator. The container may be then taken to a sink for removal of the water, which water will, of course, contain peelings, dirt, and the like, and then the peeled vegetables may be removed and the parts cleaned.

While I have shown the invention as embodied in a specific form, it is to be understood that various changes in details may be made without departing from the scope of the invention, and I therefore do not intend to limit myself except by the appended claims.

I claim:

1. In a device of the class described, a fixed casing, a container detachably mounted in said casing, means for rotating said container within the casing, a false bottom within said container and spaced from the bottom thereof, means for detachably securing said false bottom to the container, a fixed continuous wall within the container adapted to cooperate with said false bottom to peel vegetables and the like, and means to detachably secure said fixed wall to said casing.

2. In a device of the class described, a fixed casing having a vertical shaft extending through the bottom thereof, means for rotating said shaft, a container mounted within the casing, means detachably securing said container to the shaft, a false bottom within the container and spaced from the bottom thereof, and a fixed continuous side wall within the container and casing and secured to the casing, said wall and false bottom cooperating to hold and peel vegetables or the like.

3. In a device of the class described, a fixed casing having a vertical shaft extending through the bottom thereof, means for rotating said shaft, a container mounted within the casing, means detachably securing said container to the shaft, a false bottom within the container and spaced from the bottom thereof, a fixed continuous side wall within the container and casing and secured to the casing, said wall and false bottom cooperating to hold and peel vegetables or the like, and means for removably holding said false bottom in position within the container.

4. In a device of the class described, a fixed casing having a vertically extending shaft extending through the bottom thereof, a container detachably secured to said shaft to rotate therewith within the casing, a plurality of posts extending upwardly from the bottom of the container, a false bottom resting on said posts, and means for attaching the false bottom to the posts by a rotative movement thereof on the posts.

5. In a device of the class described, a fixed casing having a vertically extending shaft extending through the bottom thereof, a container detachably secured to said shaft to rotate therewith within the casing, a plurality of posts extending upwardly from the bottom of the container, a false bottom resting on said posts, said posts having upwardly extending parts extending through openings in the false bottom, and said upwardly extending parts being undercut to form recesses all facing in the same circumferential direction, whereby upon rotation of the false bottom on the posts said bottom may be received in all of said recesses.

6. In a device of the class described, a fixed casing having a vertically extending shaft extending through the bottom thereof, a container detachably secured to said shaft to rotate therewith within the casing, a plurality of posts extending upwardly from the bottom of the container, a false bottom resting on said posts, said posts having upwardly extending parts extending through openings in the false bottom, said upwardly extending parts being undercut to form recesses all facing in the same circumferential direction, whereby upon rotation of the false bottom on the posts said bottom may be received in all of said recesses, and said recesses opening in the direction in which the container is rotated.

7. In a device of the class described, a fixed casing having a vertically disposed shaft extending through the bottom thereof, means for rotating said shaft, a horizontally disposed plate mounted within the casing on the upper end of said shaft, a container disposed within the casing, means for connecting the container to the plate to rotate therewith, said means being made operative by a vertical movement of the container within the casing, a rotor within the container and secured thereto to rotate therewith, and a stator cooperating with the rotor to form a receptacle within the container and secured to said casing.

8. In a device of the class described, a fixed casing having a vertically disposed shaft extending through the bottom thereof, means for rotating said shaft, a horizontally disposed plate mounted within the casing on the upper end of said shaft and having a plurality of openings therethrough equally spaced circumferentially thereof, a container within the casing and having a plurality of legs with each leg adapted to be received in one of said openings, and a peeling device located in said container.

9. In a device of the class described, a fixed casing having a vertically disposed shaft extending through the bottom thereof, means for rotating said shaft, a horizontally disposed plate mounted within the casing on the upper end of said shaft and having a plurality of openings therethrough equally spaced circumferentially thereof, a container within the casing and having a plurality of legs with each leg adapted to be received in one of said openings, and a peeling device located in said container, said openings in the plate being relatively many with respect to the number of legs.

10. In a device of the class described, a fixed casing having a vertically disposed shaft extending through the bottom thereof, means for rotating said shaft, a container supported on the upper end of said shaft to rotate therewith, a false bottom in said container and spaced from the bottom thereof, said false bottom having upwardly extending protuberances, a wall extending upwardly from said false bottom and secured to said casing, said wall having inwardly extending protuberances, and a handle on said false bottom whereby it may be lifted from the container and replaced therein, said handle being slidable in a vertical direction, and when in its lowermost position being substantially below the upper ends of said protuberances on the false bottom.

11. In a device of the class described, a fixed casing having a vertically disposed shaft extending through the bottom thereof, means for rotating said shaft, a container supported on the upper end of said shaft to rotate therewith, a false bottom in said container and spaced from the bottom thereof, a fixed wall disposed within the container and extending upwardly from said false bottom and adapted to cooperate therewith to peel vegetables and the like, and means to secure said wall to said casing.

12. In a device of the class described, a fixed casing having a vertically disposed shaft extending through the bottom thereof, means for rotating said shaft, a container supported on the upper end of said shaft to rotate therewith, a false bottom in said container and spaced from the bottom thereof, a fixed wall disposed within the container and extending upwardly from said false bottom and adapted to cooperate therewith to peel vegetables and the like, and means to secure said wall to said casing by rotation of the wall with respect to said casing.

13. In a device of the class described, a fixed casing having a vertically disposed shaft extending through the bottom thereof, means for rotating said shaft, a container supported on the upper end of said shaft to rotate therewith, a false bottom in said container and spaced from the bottom thereof, a fixed wall extending upwardly from said false bottom and adapted to cooperate therewith to peel vegetables and the like, and means to secure said wall to said casing by rotation of the wall with respect to said casing, said means comprising radially extending lugs, and lugs on said casing overlapping therewith to prevent relative vertical movement therebetween.

14. In a device of the class described, a fixed casing having a vertically disposed shaft extending through the bottom thereof, means for rotating said shaft, a container supported on the upper end of said shaft to rotate therewith, a false bottom in said container and spaced from the bottom thereof, a fixed wall extending upwardly from said false bottom and adapted to cooperate therewith to peel vegetables and the like, means to secure said wall to said casing by rotation of the wall with respect to said casing, said means comprising radially extending lugs, lugs on said casing overlapping therewith to prevent relative vertical movement therebetween, and a latch preventing relative rotation between the wall and the casing.

15. In a device of the class described, a fixed casing having a vertically disposed shaft extending through the bottom thereof, means for rotating said shaft, a container supported on the upper end of said shaft to rotate therewith, a false bottom in said container and spaced from the bottom thereof, a fixed wall extending upwardly from said false bottom and adapted to cooperate therewith to peel vegetables and the like, means to secure said wall to said casing by rotation of the wall with respect to said casing, said means comprising radially extending lugs, lugs on said casing overlapping therewith to prevent relative vertical movement therebetween, a latch preventing relative rotation between the wall and the casing, and a handle on said container extending circumferentially of its rim and pivoted at one end with the other end adapted to move downwardly within the container for the purpose set forth.

16. In a device of the class described, a vertically disposed shaft, a container mounted on the upper end of said shaft, means for detachably holding the container on the shaft to cause it to be rotated therewith, but permitting vertical movement of the container into and out of engagement with the shaft, and one or more handles on the upper rim of said container, each handle comprising a bail having one end engaging said rim and bent on a short radius to prevent substantial vertical movement thereof and having the other end slidable in an opening in said rim and bent on a long radius whereby said other end may rotate about said first-named end, said first-named end leading said other end in the direction of rotation of said shaft.

17. In a device of the class described, a fixed casing having a vertically disposed shaft extending through the bottom thereof, means for rotating said shaft, a container supported on the upper end of said shaft to rotate therewith, a false bottom in said container and spaced from the bottom thereof, a fixed wall extending upwardly from said false bottom and adapted to cooperate therewith to peel vegetables and the like, means to secure said wall to said casing by rotation of the wall with respect to said casing, said means comprising radially extending lugs, lugs on said casing overlapping therewith to prevent relative vertical movement therebetween, a cover for said casing, and catches on the bottom of said cover extending generally parallel thereto and adapted to catch underneath said radially extending lugs upon a slight rotation of said cover.

18. In a device of the class described, a fixed casing having a vertically disposed shaft extending through the bottom thereof, means for rotating said shaft, a container supported on the upper end of said shaft to rotate therewith, a false bottom in said container and spaced from the bottom thereof, a fixed wall extending upwardly from said false bottom and adapted to cooperate therewith to peel vegetables and the like, means to secure said wall to said casing by rotation of the wall with respect to said casing, said means comprising radially extending lugs, lugs on said casing overlapping therewith to prevent relative vertical movement therebetween, a cover for said casing, and catches on the bottom of said cover extending generally parallel thereto and adapted to catch underneath said radially extending lugs upon a slight rotation of said cover, said catches when engaging said radially extending lugs holding said lugs in said overlapped relation with respect to the lugs on the casing.

19. In a device of the class described, a fixed casing having a vertically disposed shaft extending through the bottom thereof, means for rotating said shaft, a container supported on the upper end of said shaft to rotate therewith, a false bottom in said container and spaced from the bottom thereof, a fixed wall extending upwardly from said false bottom and adapted to cooperate therewith to peel vegetables and the like, means to secure said wall to said casing by rotation of the wall with respect to said casing, said means comprising radially extending lugs, lugs on said casing overlapping therewith to prevent relative vertical movement therebetween, a cover for said casing, catches on the bottom of said cover extending generally parallel thereto and adapted to catch underneath said radially extending lugs upon a slight rotation of said cover, said catches when engaging said radially extending lugs holding said lugs in said overlapped relation with respect to the lugs on the casing, and a latch on said casing engaging said cover and preventing rotation thereof.

20. In a device of the class described, a fixed casing having a rotor therein and comprising a vertically extending wall, means for operating said rotor, a stator in the form of a vertical wall cooperative with said rotor to peel vegetables or the like, a container within the casing and within which said rotor and stator are received, said container being adapted to hold water during the operation of the device and comprising a vertical wall between the walls of said casing and said rotor, means securing said stator wall to said casing, means securing said container to said rotor, and a cover fitting the top of said wall closely to prevent a splashing of water over said top.

21. In a device of the class described, a fixed casing having a rotor therein and comprising a vertically extending wall, means for operating said rotor, a stator in the form of a vertical wall cooperating with said rotor to peel vegetables or the like, a container within the casing and within which said rotor and stator are received, said container being adapted to hold water during the operation of the device and comprising a vertical wall between the walls of said casing and said rotor, means securing said stator wall to said casing, means securing said container to said rotor, and a cover fitting the top of said wall closely to prevent a splashing of water over said top, the upper edge of said container being bent inwardly to form an apron to stop the splashing of water upwardly.

ROBERT HOE.